United States Patent [19]

Araki et al.

[11] 4,139,437

[45] Feb. 13, 1979

[54] PROCESS FOR PREPARING A THERMOSETTING AQUEOUS POLYMER EMULSION USING RADIATION

[75] Inventors: Kunio Araki, Takasaki; Keizo Makuuchi, Sakai; Tohru Takagi, Hiratsuka; Hiroyuki Nakayama, Ninomiya, all of Japan

[73] Assignees: Japan Atomic Energy Research Institute, Tokyo; Kansai Paint Co., Ltd., Amagasaki, both of Japan

[21] Appl. No.: 897,366

[22] Filed: Apr. 18, 1978

[30] Foreign Application Priority Data

May 10, 1977 [JP] Japan .................................. 52-53332

[51] Int. Cl.$^2$ .............................................. C08F 8/00
[52] U.S. Cl. ......................... 204/159.16; 204/159.15;
204/159.17; 204/159.22; 260/29.6 RW;
260/29.4 UA; 260/29.6 RB; 260/851; 260/856;
260/885; 260/886
[58] Field of Search ..................... 204/159.22, 159.15,
204/159.16, 159.17; 260/885, 886, 29.6 RW,
29.6 UA

[56] References Cited

U.S. PATENT DOCUMENTS

| | | | |
|---|---|---|---|
| 3,311,579 | 3/1967 | Donat .................................... | 260/23 |
| 3,985,632 | 10/1976 | Rembaum et al. .............. | 204/159.15 |

*Primary Examiner*—Richard B. Turer

*Attorney, Agent, or Firm*—Flynn & Frishauf

[57] ABSTRACT

A process is, herein, disclosed for preparing a thermosetting aqueous polymer emulsion comprising;

(1) dispersing a monomer mixture of 90.0 – 99.9 wt % of a radical polymerizable hydrophobic ethylenic unsaturated monomer having an ethylenic unsaturated bond in its molecule and 0.1 – 10.0 wt % of a radical polymerizable crosslinkable monomer having more than two ethylenic unsaturated bonds in its molecule in water in which a specific amount of surface active agent is dissolved to form a dispersion.

(2) irradiating the dispersion with an ionizing radiation to effect the first stage emulsion polymerization.

(3) adding a monomer mixture of 52.0 – 97.0 wt % of the radical polymerizable hydrophobic ethylenic unsaturated monomer, 2.5 – 40.0 wt % of a radical polymerizable ethylenic unsaturated monomer having a hydroxyl group and 0.5 – 8.0 wt % of a radical polymerizable ethylenic unsaturated monomer having a carboxyl group to the first stage polymer emulsion in the range of 1/9 – 6/4 parts by weight on the basis of the total amount of the unsaturated ethylenic unsaturated monomers used in the first stage emulsion polymerization.

(4) irradiating with an ionizing radiation to carry out emulsion polymerization.

10 Claims, No Drawings

PROCESS FOR PREPARING A THERMOSETTING AQUEOUS POLYMER EMULSION USING RADIATION

BACKGROUND OF THE INVENTION (1) Field of the Invention

This invention relates to a process for preparing a thermosetting aqueous polymer emulsion.

(2) Description of the Prior Art

Increasing social demands for the prevention of environmental pollution and the saving of resources have tended to restrict the use of organic solvents in recent years. Therefore, the use of polymer emulsions using water as a medium has been noted in fields formerly using large amounts of organic solvents such as coatings, adhesives and so forth. Furthermore, the polymer emulsion using water has significant advantages in that it can be easily synthesized and, in addition, easily handled because its viscosity is much lower than that of the polymer solution using organic solvent having the same concentration. Therefore, polymer emulsions using water such as acrylic resin emulsion, polyvinyl acetate emulsion, ethylene-polyvinyl acetate copolymer emulsion and the like are used in a wide variety of applications, for example not only as a coating and an adhesive but also as a tackifier, finishing and treating agent for paper, fiber, woven fabric leather etc., and also as a bonding agent for non-woven materials.

However, the file obtained by drying the emulsion has an inherent fatal defect in that it easily absorbes moisture and swells and consequently its physical properties and adhesion to the substrate fall remarkably. And furthermore, as is clear from the film-forming process, the film is one in which the polymer particles are coalesced with each other, and it is, therefore, inferior to the solvent-cast film in the point of physical properties, especially, strength and toughness. Furthermore, the crosslinking of the conventional aqueous polymer emulsion has been effected by a condensation reaction of hydroxyl group in polymer particles several conditions are required in order to obtain crosslinking sufficient to provide a coating with satisfactory properties. Such conditions include lowering of the molecular weight of the polymer for effecting the permeation of the amino resin, the use of a large amount of the amino resin and baking for a long time at high temperatures. Therefore, the conventional aqueous polymer emulsion uses expensive raw materials and requires a long or complicated manufacturing process, baking process and so forth, it is not a satisfactory alternative to the conventional coating using organic solvents.

The emulsion polymerization of the radical polymerizable ethylenic unsaturated monomer by an irradiation with ionizing radiation is publicly known; however, when the system constituting a large amount of ethylenic unsaturated monomer containing high polar hydroxyl groups required for excellent properties of coating is used, it is very difficult to obtain a stable emulsion having polymer particles of the small diameter required for said emulsion in high yield, because the selective homopolymerization of the monomer in water is relatively high. Furthermore, it was not thought by anyone that crosslinking of polymer particles would occur if a system not including crosslinkable polymerizable monomer was subjected to emulsion polymerization by an irradiation with ionizing radiation, and that such crosslinking would improve significantly the coating properties.

A thermosetting polymer emulsion free from the various defects mentioned above has, therefore, long been desired by those skilled in the art.

SUMMARY OF THE INVENTION

Therefore, one object of this invention is to provide a polymer emulsion which can form a coating having excellent properties such as water-resistance, chemical-resistance, solvent-resistance, brightness, physical-property, weather-resistance and so forth.

And another object of this invention is to provide a polymer emulsion which can form a film available as an alternative to the conventional coatings using organic solvents and having properties superior to those thereof.

These and other objects as well as advantages of this invention will become apparent from the detailed description.

DETAILED DESCRIPTION OF THE INVENTION

This invention relates to a process for preparing a thermosetting aqueous polymer emulsion.

In accordance with this invention, a monomer mixture (hereunder referred to as "first stage monomer") of 90.0–99.9 wt % of a radical polymerizable hydrophobic ethylenic unsaturated monomer having an ethylenic unsaturated bond in its molecule (hereunder referred to as "hydrophobic unsaturated monomer") and 0.1–10.0 wt % of a radical polymerizable or copolymerizable crosslinkable monomer having more than two ethylenic unsaturated bonds in its molecule (hereunder referred to as "crosslinkable monomer") is dispersed in water in which a specific amount of surface active agent is dissolved to form a dispersion which is subjected to an emulsion polymerization by an irradiation with an ionizing radiation at temperatures of −5° C. to 50° C.; and then a monomer mixture (hereunder referred to as "second stage monomer") of 52.0–97.0 wt % of the hydrophobic monomer, 2.5–40 wt % of a radical polymerizable ethylenic unsaturated monomer having a hydroxyl group required for crosslinking of film (hereunder referred to as "unsaturated monomer having hydroxyl group") and 0.5–8.0 wt % of a radical polymerizable ethylenic unsaturated monomer having a carboxyl group required for the stability of an emulsion (hereunder referred to as "unsaturated monomer having a carboxyl group") is added to the "first stage monomer" in the range of 1/9–6/4 parts by weight on the basis of the weight of the "first stage monomer" and then is irradiated with an ionizing radiation at temperatures of −5° C. to 50° C. to carry out emulsion polymerization to obtain a stable thermosetting aqueous polymer emulsion incorporating polymer particles the diameter of which is extremely small.

The most important feature of this invention is that the crosslinking of the interior of polymer particles constituting the polymer emulsion, which is difficult by the conventional heat-curing can be carried out by irradiating the emulsion with an ionizing radiation. And another important feature of this invention is the addition of a specific amount of surface active agent to a thermosetting polymer emulsion and irradiation of said emulsion with an ionizing radiation to improve crosslinking in the interior of the polymer particles constituting said emulsion. A still more important feature of this invention is that the curing of the thermosetting polymer emulsion can be effected at a lower curing temperature and in a shorter curing time, and, in addition, no radical polymerization initiator and no pH-regulator is required and the amount of the surface active agent use is extremely small. The reason why an emulsion incorporating polymer particles having small diameter can be obtained is that the degree of coalescence of the polymer particles is extremely low because of the low reaction temperature and also the polymer particles are stabilized by a hydroxyl radical produced from water present in the reaction system. The reason why the stability of the polymer emulsion produced is excellent is that the diameter of the polymer particles constituting the emulsion is small and that carboxyl groups are present on the surface of the polymer particles and in addition that the amount of low molecular water soluble additives used is very small. Furthermore, since the hydroxyl groups required for the crosslinking of polymer particles can be localized only on the skin of the polymer particles for the reason that the unsaturated monomer having hydroxyl group is used only in the emulsion polymerization of the second stage monomer, a stable polymer emulsion having excellent film-forming properties is obtained, even if the amount of the unsaturated monomer having a hydroxyl group in the whole unsaturated monomers is small. Since the radiation-induced emulsion polymerization can be carried out at a low temperature, two-stage polymerization can be effected extremely easily in this invention and the localization of hydroxyl groups on the skin of the polymer particles is unexpectedly remarkable compared with the heat polymerization.

In this invention, since the first stage monomer contains the crosslinkable monomer, the interior of the polymer particles constituting the emulsion obtained by emulsion polymerization of the first stage monomer is highly crosslinked and thereby the emulsion polymerization of the second stage monomer not only proceeds smoothly but also the stability of the polymer emulsion obtained is improved. And furthermore, the crosslinking of the interior of the polymer particles contributes to improvement of the properties of the film obtained from the polymer emulsion.

It has been conventionally thought in the art that it is preferable to carry out the crosslinking reaction immediately before or after the emulsion is formed into a film rather than crosslinking the polymer while in the state of an emulsion. In other words, it has been thought that if the polymer is crosslinked while in the state of an emulsion, the glass transition temperature of the polymer will rise to make the coalescence of polymer particles in film-forming step very difficult, and therefore, a dense and uniform film cannot be formed. In accordance with this invention, however, even when the interior of the polymer particles constituting the polymer emulsion is highly crosslinked by irradiation with an ionizing radiation, the dispersalstability, film-forming property and fluidity of the polymer emulsion are not impaired, and the thus treated polymer emulsion can form a film as dense and uniform as that obtained from non-irradiated polymer emulsion and it has significantly improved water-resistance, chemical-resistance and toughness. The degree of the cross-linking is calculated from the residue after an extraction in boiled acetone for 24 hours (hereunder referred to as "gel percent"), but the degree of the crosslinking required for the improvement of the properties of the film obtained from the polymer emulsion is 5% or more of the gel percent and the higher the gel percent is, the less the amount of the crosslinking agents used becomes and the curing of the polymer emulsion can be effected at a lower curing temperature and in a shorter curing time.

Since the polymer emulsion obtained by this invention is of high stability, the various ingredients required for producing coating such as pigment can be easily incorporated in the polymer emulsion. And further, the polymer emulsion of this invention contains an extremely small amount of water soluble additives and, therefore, the water-absorption of the film obtained by curing the polymer emulsion in which the crosslinking agent such as melamine is incorporated at temperatures above 120° C. is less than 2% which is less than one-third of the water absorption of the film obtained from the emulsion by using radical polymerizable initiator.

Furthermore, since the polymer particles constituting the polymer emulsion of this invention have small diameter and are crosslinked, the film obtained from the polymer emulsion is completely and densely crosslinked even if the amount of the amine resin used is small and the curing conditions are mild, that is curing temperature is lower and curing time is shorter. For the reasons stated above, the film obtained from the coating using the polymer emulsion of this invention is superior in water-resistance, solvent-resistance, chemical-resistance, brightness, physical properties and weather-resistance and it can be substituted for the conventional coatings using organic solvents and has excellent properties superior to those of the conventional coatings.

In accordance with this invention, the thermosetting aqueous polymer emulsion is produced by dispersing the first stage monomer in water by using a specific amount of the surface active agents to form a dispersion, subjecting the dispersion to emulsion polymerization by irradiation with an ionizing radiation and adding the second stage monomer comprising a hydrophobic unsaturated monomer, an unsaturated monomer having a hydroxyl group and an unsaturated monomer having a carboxyl group to the emulsion and then irradiating with an ionizing radiation. The amount of the second stage monomer added to the first stage monomer is preferably from 1/9 to 6/4 on the basis of weight of the first stage monomer. When the amount of the second stage monomer added to the first stage monomer is below 1/9, the amount of the unsaturated monomer having a hydroxyl group is small and the properties of the film are not satisfactory; on the other hand, when it is more than 6/4, not only is it hard to produce a stable emulsion but also it is uneconomical. The total amount of the first stage monomer and the second stage monomer in the aqueous dispersion is preferably from 10% to 65%, more preferably from 30% to 50%. When it is below 10%, the film obtained from the polymer emulsion is uneconomical from the standpoint of practical value or practical use; on the contrary, when it is more than 65%, it is very difficult to produce a stable polymer emulsion incorporating polymer particles having small diameter. Any of the various kinds of methods — batch method, continuous addition, two-stage addition and so forth — for adding the first stage monomer and the second stage monomer in water may be adopted.

The hydrophobic monomer used in this invention is a radical polymerizable water-slightly soluble or water-insoluble compound having an ethylenic unsaturated bond in its molecule and illustrated below but this invention is not limited thereto. Examples are acrylic ester such as methyl acrylate, ethyl acrylate, propyl acrylate, butyl acrylate, 2-ethylhexyl acrylate, lauryl acrylate etc., methacrylic ester such as methyl methacrylate, ethyl methacrylate, propyl methacrylate, butyl methacrylate, 2-ethylhexyl methacrylate, lauryl methacrylate etc., vinyl ester such as vinyl acetate, vinyl propionate, vinyl styrene such as styrene, 2-methylstyrene, vinyltoluene, chlorostyrene etc. These hydrophobic unsaturated monomers are the main component of the film and used independently or in combination with each other in this invention.

In radiation-induced emulsion polymerization, when the emulsion contains an unsaturated monomer having a hydroxyl group, the interior of the polymer particles constituting the emulsion is crosslinked, but the degree of the crosslinking, that is gel percent is limited to the range of from 5% to 50%. A crosslinkable unsaturated monomer is required in order to more effectively crosslink the interior of a higher proportion of the polymer particles. That is to say, a polymer emulsion the gel percent in which is from 50% to 99% can be produced by using the crosslinkable unsaturated monomer. The crosslinkable unsaturated monomer used in this invention is a radical polymerizable and or radical copolymerizable compound having more than two reactive carbon to carbon double bond or triple bonds in its molecule. In order to carry out the crosslinking of the interior of the polymer particles more effectively, the lipophilic ones are preferable. Representative lipophilic monomers are illustrated below but this invention is not limited thereto; glycol dimethacrylate such as polyethylene glycol, polypropylene glycol etc.; di-ortric-acrylic ester or di-ortri-methacrylic ester such as 1,1,1-trihydroxy methyl ethane, 1,1,1-trihydroxy methyl propane etc.; tetramethacrylic ester or tetraacrylic ester of pentaerythritol, triallyl compounds such as triallyl cyanurate, triallyl isocyanurate, triallyl trimellitate, etc.; divinyl benzene, di-or tripropargylic acid ester. These polyfunctional monomers are used independently or in combination with each other in this invention. These polyfunctional monomers are preferably liquid at about room temperature; however, when they are solid and have melting point below 60° C., they are melted to be added to the heated emulsion. And when they are dissolved in a liquid polyfunctional monomer or proper solvent, it is not necessary to consider the melting points thereof. The amount of polyfunctional monomer added to the first stage monomer is preferably from 0.1% to 10%, more preferably from 0.3% to 3% on the basis of weight of the first stage monomer. When it is below 0.1%, it is difficult to obtain more than 50% of gel percent and when it is more than 10%, not only the coalescence of the polymer is difficult, but also it is uneconomical.

Representative unsaturated monomers having a hydroxyl group used in this invention are 2-hydroxyethyl acrylate, 2-hydroxyethyl methacrylate, 2-hydroxypropyl acrylate, 2-hydroxypropyl methacrylate, N-methylolacrylamide, allyl alcohol, etc. These unsaturated monomers are used independently or in combination with each other in this invention. The amount of the unsaturated monomer in the second stage monomer is dependent on the proportion of the amount of the first stage monomer to the amount of the second stage monomer but is preferably from 2.5% to 40%, more preferably from 5% to 15% on the basis of the weight of the second stage monomer. When it is below 2.5%, the degree of the crosslinking in the interior of the polymer particles constituting the polymer emulsion obtained is not sufficient and the three-dimensional crosslinking in the film is insufficient because the number of oxygen atom which reacts with the crosslinking agents is few and therefore the film obtained from the polymer emulsion is poor in solvent-resistance, chemical-resistance, physical-resistance and other properties. When it is more than 40%, not only is it uneconomical, but also selective polymerization in water is apt to occur in the emulsion polymerization and this makes it very difficult to produce a highly stable polymer emulsion incorporating polymer particles the diameter of which is small.

An unsaturated monomer having a carboxyl group is used in order to inhibit occurrence of the selective polymerization of the unsaturated monomer in water. Representative of the unsaturated monomers used in this invention are acrylic acid, methacrylic acid, crotonic acid, itaconic acid, etc. and these monomers are used independently or in combination with each other. The amount of the unsaturated monomer added to the second stage monomer is from 0.5% to 8.0%, more preferably from 0.4% to 2.5% on the basis of the weight of the second stage monomer. The amount of the unsaturated monomer is preferably less than 1/5 of the weight of the unsaturated monomer having a hydroxyl group. When the amount of the unsaturated monomer having a carboxyl group added to the second stage monomer is below 0.5% on the basis of the weight of the second stage monomer, a good deal of selective polymerization of the unsaturated monomer having a hydroxyl group in water is apt to occur and it is very difficult to obtain a highly stable polymer emulsion incorporating polymer particles the diameter of which is small. When the amount of the unsaturated monomer having a carboxyl group added to the second stage monomer is more than 8% on the basis of the weight of the second stage more or it is more than 1/5 on the basis of the weight of the unsaturated monomer having a hydroxyl monomer, selective polymerization of the unsaturated monomer having a hydroxyl group in water is apt to occur and inhibits the production of the good stable polymer emulsion constituted of the polymer particles the diameter of which is small.

In accordance with this invention, the polymer emulsion desired is produced by dispersing the whole unsaturated monomer in water containing a specific amount of the surface active agent to form a dispersion and subjecting the dispersion to emulsion polymerization by irradiation with an ionizing radiation.

The total amount of the unsaturated monomers in the aqueous dispersion is from 10% to 65%, preferably from 30% to 50% on the basis of the weight of the aqueous dispersion. The amount below 10% is uneconomical from the stand point of practical value and when it is more than 65%, it is very difficult to produce a good stable polymer emulsion incorporating polymer particles the diameter of which is small. Several methods for dispersing the first stage monomer or the second stage monomer in water are adopted in this invention; that is, all of the monomers may be dispersed in water before irradiation with an ionizing radiation or all of the monomers may be continuously added in water while irradiating with an ionizing radiation or all of the monomers may be divided into two or more portions which may be dispersed at an optional time while irradiating with an ionizing radiation.

The amount of the surface active agent used in this invention is from 0.05% to 10.0%, more preferably from 0.05% to 1.0% on the basis of the weight of the total amount of the first stage monomer and the second stage monomer, which amount is extremely small compared with the amount used in the heat polymerization method using radical polymerization initiator. The surface active agents conventionally used are available in this invention, for example a nonion surface active agent such as polyethylene glycol nonylphenylether, polyethylene glycol dodecylphenyl ether, etc., an anion surface active agent such as sodium dodecyl benzenesulfonate, etc.

The ionizing radiation used in this invention may include electron beam, alpha rays, beta rays, gamma rays or X-rays. The choice of radiation source and the total dose of the radiation depend on the components of the monomers used, the concentration of the monomer in the polymer emulsion, the radiation atmosphere and temperature, the physical properties of the film to be obtained and the cost of the radiation apparatus. In General, the total dose of the radiation may range from 0.01 Mrad to 1.0 Mrad.

Since heat is generated when the emulsion polymerization is carried out by irradiation with an ionizing radiation, the reaction temperature should be controlled within the range of from $-5°$ C. to $50°$ C., preferably from $0°$ C. to $30°$ C. by appropriate means such as water cooling. When the reaction temperature is more than $50°$ C., the polymer particles are apt to coalesce and it is very difficult to produce a polymer emulsion incorporating polymer particles the diameter of which is small.

When the polymer emulsion of this invention is used for paint, the addition to the polymer emulsion of a water soluble amino resin which reacts with polyhydroxyl groups contained in the polymer emulsion is very effective. Representative water soluble amino resins are di-, tri-, tetra-, penta- and hexamethylolmelamine and methyl-etherified and butyl-etherified compounds thereof, condensation compounds of urea and formaldehyde and condensation compounds of urea and melamine, etc. The amount of the water soluble amino resin to be contained in the polymer emulsion of this invention is preferably from 5% to 50% on the basis of the weight of the polymer components of the emulsion and when it is within the range, the film is excellent in water-resistance, solvent-resistance, chemical-resistance, physical-properties and weather-resistance.

Various kinds of auxiliaries, such as pigments, thickening agents, antiseptics, antifoamers, pH-adjustors, etc., may be added to the thermosetting polymer emulsion before or after irradiation, if desired.

The irradiation may be effected within the temperature range over which the emulsion is stable. The irradiation may be effected in, preferably, an inert atmosphere, but also may be effected at room temperature in air.

This invention is further illustrated by the following Examples, Reference Examples and Comparative Example; Examples Nos. 1, 2 and 3 describe the process for production of the polymer emulsion of this invention, Reference Examples Nos. 1, 2 and 3 describe the production of paints and coatings using the polymer emulsion of this invention as paint vehicle and Comparative Example No. 1 describes the production of polymer emulsion by heat-emulsion polymerization and the production of paint and film using said polymer emulsion as the paint vehicle.

However, this invention should not be limited by these examples, and changes and modifications within the spirit and scope of the claims can be effected. The percent and parts in the Examples are base on weight unless otherwise specified.

EXAMPLE 1

Into a 3000 ml four-necked glass flask equipped with a stirring rod, a nitrogen gas inlet tube, a thermometer and a cooling tube, was charged first stage monomer mixture of 1050 g of deionized water, 135 g of ethyl acrylate, 1.5 g of trimethylol propane trimethacrylate, 90 g of methyl methacrylate, 0.4 g of sodium lauryl benzene sulfonate and 0.4 g of polyethylene glycol dodecylphenyl ether and was irradiated with gamma rays from Co-60 for 2 hours at a dose rate of 0.03 Mrad/hr with stirring in an atmosphere of nitrogen to form a polymer emulsion of the first stage monomer mixture. To this flask was subsequently added a second stage monomer mixture of 135 g of ethyl acrylate, 74 g of methyl methacrylate, 14 g of 2-hydroxyethyl acrylate, and 2 g of acrylic acid and was irradiated with gamma rays from Co-60 under the same condition as those employed in the polymerization of the first stage monomer mixture to obtain a polymer emulsion (hereinafter referred as "Em-A"). No build-up of polymer was observed on the stirring rod and no aggregation of polymer was observed in Em-A.

The other properties of Em-A are shown in the Table.

EXAMPLE 2

Into the same flask as employed in Example 1 were charged 750 g of deionized water and 4 g of sodium laurylbenzene-sulfonate and subsequently half of the first stage unsaturated monomer mixture of 300 g of ethyl acrylate, 200 g of ethyl methacrylate and 5 g of diethylene glycol dimethyacrylate was charged and was irradiated with gamma rays from Co-60 for 1.5 hours at a dose rate of $3 \times 10^4$ rad/hr under the same conditions as those employed in Example 1 and, then the residual first stage unsaturated monomer mixture was charged and was irradiated with gamma rays from Co-60 for 1.5 hours at a dose rate of $3 \times 10^4$ rad/hr under the same conditions as those employed in Example 1 to complete the first stage emulsion polymerization. To this flask was then added the second stage unsaturated monomer mixture of 110 g of ethyl acrylate, 74 g of methyl methacrylate, 62 g of 2-hydroxypropyl acrylate, 3 g of acrylic acid and 1 g of methacrylic acid and was irradiated with gamma rays from Co-60 for 2 hours at a dose rate of $3 \times 10^4$ rad/hr under the same conditions as those employed in Example 1 to obtain the polymer emulsion (hereinafter referred to as "Em-B"). No aggregation of polymer was observed in the flask. The properties of Em-B are shown in the Table.

EXAMPLE 3

Into a 3000 cc three-necked flask equipped with a stirring rod, a nitrogen gas inlet tube, a dropping funnel, a thermometer and a cooling tube were charged 900 g of deionized water and 4 g of polyethylene glycol nonylphenylether and then 250 g of vinyl propionate and 15 g of divinyl benzene were added dropwise over 1.5 hours to this flask with an irradiation with gamma rays from Co-60 for 2 hours at a dose rate of 0.03 Mrad/hr under the same conditions as those employed in Example 1 to complete the first stage emulsion polymerization. And then, the second stage unsaturated monomer mixture of 305 g of vinyl propionate, 40 g of 2-hydroxyethyl methacrylate and 4 g of acrylic acid was added dropwise over 1.5 hours to this flask with an irradiation with gamma rays under the same conditions. After dropping the second stage unsaturated monomer mixture, the irradiation was carried out further for 2 hours to obtain a polymer emulsion (hereunder referred to as "Em-C"). No aggregation of the polymers was observed in Em-C. The properties of Em-C are shown in the Table.

REFERENCE EXAMPLE 1

A resin comprising 27 wt% of methyl acrylate, 50 wt% of ethyl acrylate, 15 wt% of 2-hydroxyethyl methacrylate and 8 wt% of acrylic acid having about 7,000 of average molecular weight was neutralized and dissolved in deionized water to form 20% water soluble resin solution (hereunder referred to as "water soluble resin solution"). Into a 4000 ml ball mill were charged 600 g of the water soluble resin solution, 1000 g of titanium white manufactured by Teikoku Kako Co., Ltd. and 4 g of Nopco 8034 (trade name for anti-foaming agent sold from Sun Nopco Co., Ltd.) and dispersed for 4.8 hours to obtain a dispersion (hereunder referred to as "pigment dispersion"). 160 g of the pigment dispersion, 250 g of Emulsion-A (adjusted to a pH value of from pH 8 to 9) and 13 g of hexakis methoxymethylolmelamine were mixed under agitation to obtain paint (hereunder referred to as "Paint-A").

The paint-A was coated onto a steel plate treated with zinc phosphate by spraying and dried with heat at 140° C. for 30 minutes to obtain a film 40μ thick.

The properties of the film are shown in the Table.

REFERENCE EXAMPLE 2

160 g of the paint dispersion, 150 g of Emulsion-B (adjusted to a pH value of from pH 8 to 9 with ammonia), 13 g of hexakis methoxy methylolmelamine and 77 g of deionized water were charged in a flask and mixed under agitation to obtain paint (hereunder referred to as "Paint-B"). The Table shows the properties of the Paint-B.

REFERENCE EXAMPLES 3

Into a flask were charged 160 g of the pigment dispersion, 188 g of emulsion-C (adjusted to a pH value of from pH 8 to 9 with ammonia), 13 g of hexa( ) methoxymethylol melamine and 39 g of deionized water and mixed under agitation to obtain paint (hereunder referred to as "Paint-C"). The Table shows the properties of the Paint-C.

COMPARATIVE EXAMPLE

Into a 3000 ml of four-necked flask equipped with a stirring rod, a nitrogen gas inlet tube, a dropping funnel, a thermometer and a cooling tube were charged 700 g of deionized water, 7 g of sodium laurylbenzene sulfonate, 8 g of polyethylene glycol nonyl phenylether and 1.5 g of ammonium persulfate and then was charged the first stage unsaturated monomer mixture used in Example 1 over 3 hours under sufficient agitation in an atmosphere of nitrogen while the reaction temperature was maintained at 70° C. to complete polymerization. To this flask were subsequently added the second stage unsaturated monomer mixture and a water solution in which 3 g of ammonium persulfate were dissolved in 50 g of deionized water and mixed under sufficient agitation for 2 hours in an atmosphere of nitrogen while the reaction temperature was maintained at 70° C. to obtain an emulsion (hereunder referred to as "Emulsion-D"). The Table shows the various properties of Emulsion-D. Paint-D was prepared in the same manner as described in Reference Example 2, with the exception that Emulsion-D was used in place of Emulsion-B. The Paint-D was dried by heat at 140° C. for 30 minutes to obtain a film. The properties of the film obtained were unsatisfactory as shown in the Table.

PROPERTY ASSESSMENT

The various properties of emulsion produced by Examples Nos. 1, 2 and 3, the paint and the film produced in Reference Examples Nos. 1, 2 and 3 are shown compared with those obtained by Comparative Example.

In the Table, samples A, B, C and D correspond to those of emulsion, paint and film produced in Examples, Reference Examples and comparative Example respectively.

Testing methods (1) Formation of aggregation: Observation by naked eye
(2) Nonvolatile content: ASTM D2832-69
(3) Viscosity: ASTM D2196-68
(4) pH: ASTM E70-68
(5) Particle diameter: Electron microscope
(6) Residual monomer: Percentage by weight to monomer charged by virtue of gas chromatography.
(7) Gel percent (degree of crosslinking): $W_1$ g of the film was boiled in acetone for 24 hours to obtain a dry weight of $W_2$ g. Gel percent (%) was calculated from $(W_2/W_1) \times 100$.
(8) Freeze-thaw stability: ASTM D2243-68.
   Initial viscosity of a paint is $\phi_1$. The paint is left at $-20°$ C. for 8 hours and subsequently at 25° C. for 16 hours; the viscosity ($\phi_2$) is measured when the paint has gone through the cycle five times. The freeze-thaw stability is calculated from $\phi_1/\phi_2$.
(9) Stability to heat: Initial viscosity of a paint is $\phi_1$. The viscosity of the paint which is left standing at 50° C. for 7 days is $\phi_2$. The stability to heat is calculated from $\phi_1/\phi_2$.
(10) Luster: Reflection of the film observed at 60° in accordance with JIS K5400.
(11) Hardness: Pencil hardness.
(12) Water-resistance: The film is soaked in tap water at 40° C. for 20 days. Thereafter, the blisters on the surface of the film are observed in accordance with ASTM D714-56.
(13) Alkali-resistance: 0.2 cc of 0.1 N NaOH is put on the surface of the film for 24 hours. After rinsing, any change in the surface of the film is observed.
(14) Acid-resistance: 0.2 cc of 0.1 N $H_2SO_4$ is put on the surface of the film for 24 hours. After rinsing, any change in the surface of the film is observed.
(15) Anti-xylol activity: The surface of the film is vigorously rubbed with xylene-containing gauze 20 times and any change in the surface is observed.
(16) Erichsen test: By using Erichsen test (20 $\phi$ ball).
(17) Impact-resistance: By using du pont impact tester. A steel ball weighing 500 g and ½ inch in diameter is dropped on the surface of the film and the height of the ball's bounce is measured when deterioration in the surface of the film is observed.
(18) Weather-resistance: The film is subject to a sunshine weather meter for 400 hours and thereafter the luster of the film is measured.

(19) Rinsing-resistance: ASTM D-2486-96T. The times when the film is broken are measured.

The Table shows clearly that the polymer emulsion of this invention, the paint produced therefrom and the film obtained by curing the paint are superior to those obtained from the polymer emulsion produced by heat-emulsion polymerization in the properties required for the paint and the film.

Table

| Kind of Samples | Properties | Identification of Samples | | | |
|---|---|---|---|---|---|
| | | A | B | C | D |
| Emulsion | Aggregation | No | No | No | Blob. |
| | Non-volatile content(%) | 29.8 | 50.1 | 40.6 | 50.3 |
| | Viscosity (CP) | 175 | 785 | 385 | 1750 |
| | pH | 6.0 | 4.1 | 5.2 | 3.5 |
| | particle diameter($\mu$) | 0.3> | 0.2> | 0.3> | 0.5–1.0 |
| | Residual monomer(%) | 0.1 | 0.2 | 0.1 | 0.4 |
| | Gel Percent (%) | 92 | 83 | 88 | 53 |
| Paint | Freeze-thaw | 1.0 | 1.0 | 1.2 | 2.0 |
| | Stability to heat | 1.1 | 1.2 | 1.3 | 2.6 |
| | Luster | 90 | 92 | 88 | 80 |
| | Hardness | 2H | F | H | F |
| Film | Water-resistance | No | No | No | MD |
| | Alkali-resistance | o | o | o | □ |
| | Acid resistance | o | o | o | □ |
| | Anti-xylol activity | 30 times o | 30 times o | 30 times o | 30 times x |
| | Erichsen test (mm) | 10< | 10< | 10< | 4 |
| Film | Impact resistance (cm) | 50< | 50< | 50< | 30 |
| | Weather-resistance | 83 | 87 | 82 | 60 |
| | Rinsing-resistance (times) | 5000< | 5000< | 5000< | 3000 |

Notes:
o:good
□:spots
x:flaws
D:Dense
MD:Medium dense
M:Medium
F:Few

What is claimed is:

1. A process for preparing a thermosetting aqueous polymer emulsion comprising:

(1) dispersing a monomer mixture of 90.0–99.9 wt % of a radical polymerizable hydrophobic ethylenic unsaturated monomer having an ethylenic unsaturated bond in its molecule and 0.1–10.0 wt % of a radical polymerizable crosslinkable monomer having more than two ethylenic unsaturated bonds in its molecule in water in which a specific amount of surface active agent is dissolved to form a dispersion, (2) irradiating the dispersion with an ionizing radiation to effect the first stage emulsion polymerization, (3) adding a monomer mixture of 52.0–97.0 wt % of the radical polymerizable hydrophobic ethylenic unsaturated monomer, 2.5–40.0 wt % of a radical polymerizable ethylenic unsaturated monomer having a hydroxyl group and 0.5–8.0 wt % of a radical polymerizable ethylenic unsaturated monomer having a carboxyl group to the first stage polymer emulsion in the range of 1/9–6/4 parts by weight on the basis of the total amount of the unsaturated ethylenic unsaturated monomers used in the first stage emulsion polymerization, (4) irradiating with an ionizing radiation to carry out emulsion polymerization.

2. The process of claim 1 wherein the radical polymerizable hydrophobic ethylenic unsaturated monomer having an ethylenic unsaturated bond in its molecule is selected from the group consisting of acrylic ester, methacrylic ester, vinyl ester, styrene and mixtures thereof.

3. The process of claim 1 wherein the radical polymerizable ethylenic unsaturated monomer having a hydroxyl group in its molecule is selected from the group consisting of 2-hydroxyethyl acrylate, 2-hydroxyethyl methacrylate, 2-hydroxypropyl acrylate, 2-hydroxypropyl methacrylate, N-methylol-acrylamide, allyl alcohol and mixtures thereof.

4. The process of claim 1 wherein the radical polymerizable ethylenic unsaturated monomer having a carboxyl group in its molecule is selected from the group consisting of acrylic acid, methacrylic acid, crotonic acid, itaconic acid and mixtures thereof.

5. The process of claim 1 wherein the radical polymerizable crosslinkable monomer having more than two ethylenic unsaturated bond in its molecule is selected from the group consisting of glycol dimethacrylate, di-or triacrylic ester or di-or trimethacrylic ester, tetramethacrylic ester or tetraacrylic ester of penlaerythritol, triallyl compounds, divinyl benzene, di-or triproparglyic ester and mixtures thereof.

6. The process of claim 1 wherein the specific amount of the surface active agent is from 0.05% to 10.0%, more preferably from 0.05% to 1.0% on the basis of the weight of the total amount of the unsaturated monomers used.

7. The process of claim 1 wherein the ionizing radiation is selected from the group consisting of electron beam, alpha rays, beta rays, gamma rays and X-rays.

8. The process of claim 1 wherein the total dose of the radiation may range from $10^4$ rad. to $10^6$ rad.

9. The process of claim 1 wherein the total amount of the unsaturated monomers in an aqueous dispersion is from 10% to 65%, more preferably from 30% to 50% on the basis of the weight of the aqueous dispersion.

10. The process of claim 1 wherein the emulsion polymerization is carried out at temperatures of from −5° C. to 50° C., more preferably of from 0° C. to 30° C.

* * * * *

UNITED STATES PATENT AND TRADEMARK OFFICE
CERTIFICATE OF CORRECTION

PATENT NO. : 4,139,437
DATED : February 13, 1979
INVENTOR(S) : KUNIO ARAKI et al It is certified that error appears in the above-identified patent and that said Letters Patent are hereby corrected as shown below:

Column 11, in the Table:
    after "Gel Percent (%)", draw a horizontal line through the Table to separate the properties of "Emulsion" from those of "Paint";
    after "Freeze-thaw", insert ---stability---.
    after "Stability to heat", draw a horizontal line through the Table to separate the properties of "Paint" from those of "Film".

Signed and Sealed this

Second Day of October 1979

[SEAL]

Attest:

RUTH C. MASON
Attesting Officer

LUTRELLE F. PARKER
Acting Commissioner of Patents and Trademarks